US012638153B2

(12) United States Patent
Mase

(10) Patent No.: US 12,638,153 B2
(45) Date of Patent: May 26, 2026

(54) LIGHTING DEVICE

(71) Applicant: Panasonic Intellectual Property Management Co., Ltd., Osaka (JP)

(72) Inventor: Kenichiro Mase, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/961,663

(22) Filed: Nov. 27, 2024

(65) Prior Publication Data

US 2025/0093013 A1 Mar. 20, 2025

Related U.S. Application Data

(63) Continuation of application No. PCT/JP2023/019214, filed on May 23, 2023.

(30) Foreign Application Priority Data

Jun. 9, 2022 (JP) ................................ 2022-093507

(51) Int. Cl.

| | |
|---|---|
| ***F21V 5/00*** | (2018.01) |
| ***F21V 5/04*** | (2006.01) |
| ***F21W 131/406*** | (2006.01) |

(52) U.S. Cl.

CPC ................ *F21V 5/007* (2013.01); *F21V 5/04* (2013.01); *F21W 2131/406* (2013.01)

(58) Field of Classification Search

CPC ... F21V 5/007; F21V 5/04; F21V 5/08; F21V 5/045; F21V 5/048; F21V 5/0408; F21W 2131/406; F21S 8/024; F21S 8/026; F21S 8/022; F21Y 2103/10

See application file for complete search history.

(56) References Cited

U.S. PATENT DOCUMENTS

2013/0051030 A1* 2/2013 Lee .................... G02B 19/0014 362/332
2014/0313734 A1* 10/2014 Seki ................... G02B 19/0028 362/296.01

(Continued)

FOREIGN PATENT DOCUMENTS

CN 101532637 B * 11/2012
JP 2005-183090 7/2005

(Continued)

OTHER PUBLICATIONS

International Search Report of PCT application No. PCT/JP2023/019214 dated Jun. 27, 2023.

*Primary Examiner* — Erin Kryukova

(74) *Attorney, Agent, or Firm* — Wenderoth, Lind & Ponack, L.L.P.

(57) ABSTRACT

A lighting device that emits light to a lighting target surface and includes a light source, and a lens having an incident surface that receives light emitted from the light source and an emission surface that emits the light received by the incident surface. The emission surface is a convex curved surface. The curvature of the emission surface along a first direction perpendicular to an optical axis direction of the lens is smaller than the curvature of the emission surface along a second direction perpendicular to the optical axis direction and the first direction.

17 Claims, 12 Drawing Sheets

(56) References Cited

U.S. PATENT DOCUMENTS

| | | | | |
|---|---|---|---|---|
| 2015/0078011 A1* | 3/2015 | Sy | F21V 7/048 362/327 |
| 2016/0053971 A1* | 2/2016 | Takizawa | G02B 27/30 362/327 |
| 2016/0290611 A1* | 10/2016 | Goldstein | F21S 8/00 |
| 2018/0073692 A1* | 3/2018 | Jurik | F21V 5/04 |
| 2019/0368684 A1* | 12/2019 | Frison | F21V 5/007 |

FOREIGN PATENT DOCUMENTS

| | | |
|---|---|---|
| JP | 2014-127380 | 7/2014 |
| JP | 2018-037141 | 3/2018 |
| JP | 2019-102175 | 6/2019 |
| JP | 2021-018899 | 2/2021 |

* cited by examiner

LIGHTING DEVICE

TECHNICAL FIELD

The present disclosure relates to a lighting device.

BACKGROUND ART

There has conventionally known a lighting device for a lighting setup called a horizontal light that lights a background wall of a studio of a television company, a stage, or the like.

For example, the lighting device of PTL 1 includes a first light source and a second light source. The light of the second light source is emitted above the background wall and has a flat light distribution characteristic. A plurality of prisms are provided on a reflection surface of a light guide plate. The light of the first light source is emitted lower than the light of the second light source on the background wall (lighted surface) and forms a region having a light distribution characteristic with higher illuminance than the surroundings (that is, stray light). As a result, the lighting device of PTL 1 forms a light pool on the lower portion of the background wall, and has a stretched light distribution characteristic in which illuminance gradually decreases toward the upper portion of the background wall.

CITATION LIST

Patent Literature

PTL 1: Unexamined Japanese Patent Publication No. 2014-127380

SUMMARY OF THE INVENTION

In recent years, a need for enhancing color rendering properties by a lighting device has been increasing. Not only for a wide space like a stage, there is a demand for a lighting device with such a high quality as can be used for a lighting setup in a narrow space such as a corridor or a limited small space such as in a train, a car, and an airplane. Thus, a lighting device that is made small in size and capable to be disposed near a lighting target surface is needed.

An object of the present disclosure is to provide a lighting device that can be made small in size and ensure lighting quality even when the lighting device is disposed near a lighting target surface.

To achieve the above object, a lighting device according to one exemplary embodiment of the present disclosure is a lighting device that emits light to a lighting target surface and includes a light source, and a lens having an incident surface that receives light emitted from the light source and an emission surface that emits light received by the incident surface. The emission surface is a convex curved surface. The curvature of the emission surface along a first direction perpendicular to an optical axis direction of the lens is smaller than the curvature of the emission surface along a second direction perpendicular to the optical axis direction and the first direction.

According to the present disclosure, the lighting device can be downsized, and lighting quality can be ensured even when the lighting device is disposed near a lighting target surface.

DESCRIPTION OF EMBODIMENT

Hereinafter, exemplary embodiments of the present invention will be described in detail with reference to the drawings. The following description of preferred exemplary embodiments is merely exemplary in nature and is not intended to limit the present invention, its applications, or its usages. In the following description, the same parts are denoted by the same reference mark, and detailed description thereof will be omitted as appropriate.

First Exemplary Embodiment (Configuration of Lighting Device)

Figure 1:
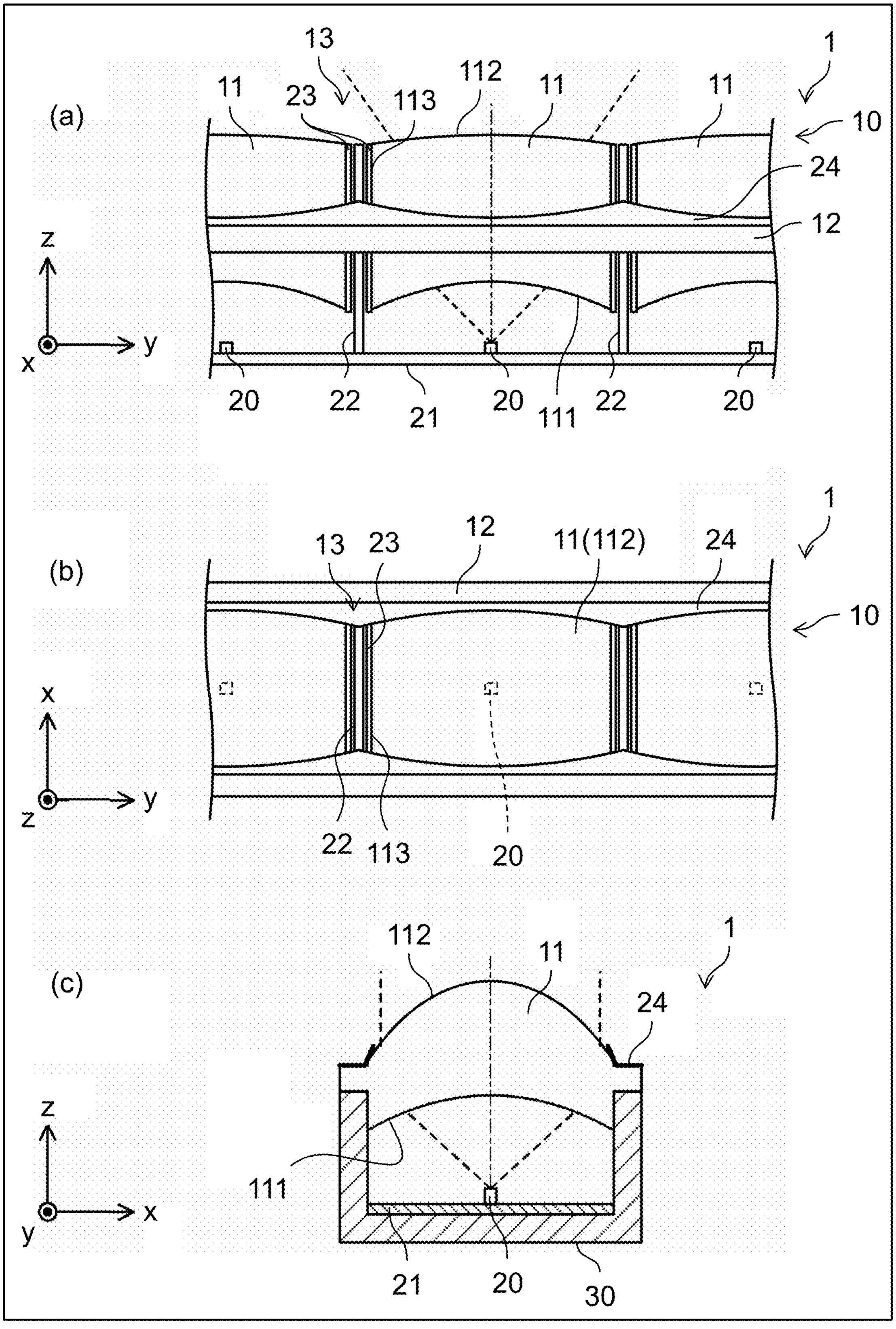
FIG. 1 is a configuration diagram of a lighting device according to a first exemplary embodiment.
Figure 2:
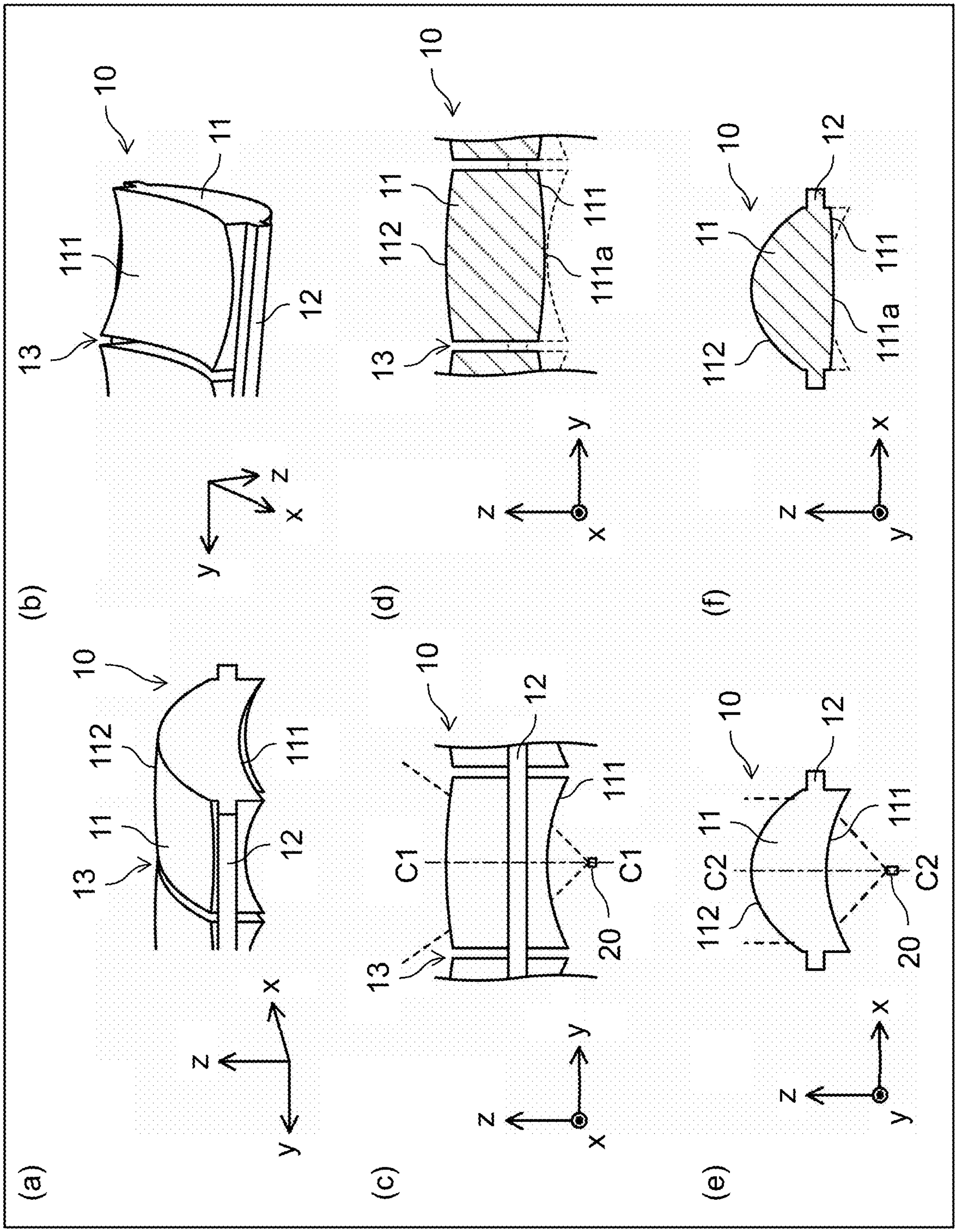
FIG. 2 is a configuration diagram of a lens according to the first exemplary embodiment.

FIG. 1 is a configuration diagram of a lighting device according to a first exemplary embodiment, and FIG. 2 is a configuration diagram of a lens according to the first exemplary embodiment. Specifically, part (a) of FIG. 1 is a front view of lighting device 1, part (b) of FIG. 1 is a top view of lighting device 1, and part (c) of FIG. 1 is a side cross-sectional view of lighting device 1. Part (a) of FIG. 2 is a perspective view of lens 11 as viewed from above, part (b) of FIG. 2 is a perspective view of lens 11 as viewed from below, part (c) of FIG. 2 is a front view of lens 11, part (d) of FIG. 2 is a front cross-sectional view of a side central portion of lens 11, part (e) of FIG. 2 is a side view of lens 11, and part (f) of FIG. 2 is a side cross-sectional view of a front central portion of lens 11. In the drawings including FIG. 1, description will be given under the definition that an optical axis direction of lens 11 is z direction (corresponding to the optical axis direction), an extending direction of lens connector 12 (the arrangement direction of lenses 11) is y direction (corresponding to a first direction), and a direction perpendicular to the y direction and the z direction is x direction (corresponding to a second direction). In the following description, the light emitted from LED light source 20 is indicated by broken lines in the drawings including FIG. 1.

As illustrated in FIGS. 1 and 2, lighting device 1 includes lens unit 10, LED light sources 20, and housing 30. Housing 30 accommodates LED light sources 20, and lens unit 10 is disposed at an opening of housing 30.

Lens unit 10 includes a plurality of lenses 11 and a pair of lens connectors 12.

Lens 11 is a lens formed in a substantially semi-cylindrical shape, and is formed of a transparent optical member such as optical glass or an optical resin material. A plurality of lenses 11 are arranged in the y direction, and are connected to each other by a pair of lens connectors 12 facing each other in the x direction. Slit 13 is formed between adjacent lenses 11. Lens unit 10 is formed by injection molding or the like. Lens connector 12 is a member formed of resin, for example.

Lens 11 has incident surface 111 and emission surface 112. Lens 11 receives light from LED light source 20 by incident surface 111 and emits light from emission surface 112.

Incident surface 111 is a concave curved surface having convex portion 111*a* at a central portion in an xy plane (see parts (c) to (f) of FIG. 2). That is, incident surface 111 has such a shape that the central portion is convex and the portion around the central portion is concave. This shape creates a light distribution with a reduced illuminance in the central portion and a smooth illuminance change in the peripheral portion. Thus, lens 11 creates a light distribution that gradually changes darker from the central portion to the outer edge.

Emission surface 112 is a curved surface having a prominent convex shape along the x direction and a gentle convex shape along the y direction (see parts (c) to (f) of FIG. 2). That is, emission surface 112 has a smaller convex curvature along the y direction than along the x direction. Emission surface 112 creates with this shape a light emitted from lens 11 not diffusing in the x direction and diffusing in the y direction.

LED light source 20 is a light source including an LED (Light Emitting Diode), for example. LED light source 20 is mounted on LED substrate 21, and when a current is applied emits light having a wavelength and intensity corresponding to the characteristics of LED light source 20. LED light source 20 can output a light of any color. LED light source 20 may be a single color light source or a light source of a plurality of colors. As illustrated in the drawings including FIG. 1, LED light source 20 emits a diffused light spreading in certain ranges in the x direction and the y direction.

As illustrated in parts (a) and (b) of FIGS. 1, a plurality of LED light sources 20 are arranged on LED substrate 21. In the present exemplary embodiment, one LED light source 20 is disposed to correspond to one of lenses 11.

Lenses 11 are arranged with a predetermined distance therebetween in the y direction. Thus, slit 13 is formed between lenses 11 adjacent in the y direction. Slit 13 formed between lenses 11 allows only the light emitted from the corresponding one of LED light sources 20 to enter lens 11 and disallows entering of the light emitted from LED light sources 20 corresponding to other lenses 11.

Light shielding plate 22 is disposed in slit 13. Light shielding plate 22 is formed of a black resin, a metal material, or the like, and is desirably formed of a mat-like material having a high diffusivity to discourage regular reflection on the surface of light shielding plate 22. For lens 11, light shielding plate 22 can prevent entering of the light emitted from LED light sources 20 corresponding to other lenses 11.

Absorption layer 23 is formed on side surface 113, facing the y direction, of lens 11. Absorption layer 23 is a black, sheet-like layer, and has an adhesive surface having a refractive index close to that of lens 11. Absorption layer 23 can prevent interface reflection that may occur at side surface 113 of lens 11.

On incident surface 111 of lens 11, stray light cover 24 is disposed to cover an outer rim in the x direction. Stray light cover 24 is formed of a black resin or a metal material, and is desirably formed of a mat-like material having a high diffusivity to discourage regular reflection on the surface. LED light source 20 emits a diffused light spreading radially in an arc shape in plan view. In contrast, emission surface 112 of lens 11 is rectangular in plan view. Thus, stray light may be created at a corner of emission surface 112 of lens 11. Covering corners (four corners) of emission surface 112 with stray light cover 24 can suppress occurrence of stray light. Note that, stray light may by suppressed without using stray light cover 24 by forming lens 11 (specifically, shaping emission surface 112, for example, of lens 11) in a circular shape in plan view. In this case, the connection area between lens connector 12 and lens 11 is reduced, and this means that the cross-sectional shape significantly changes locally from lens connector 12 to lens 11. This results in a low rigidity of lens unit 10. Therefore, stray light cover 24 is preferable used.

(Arrangement of Lighting Device)

Figure 3:
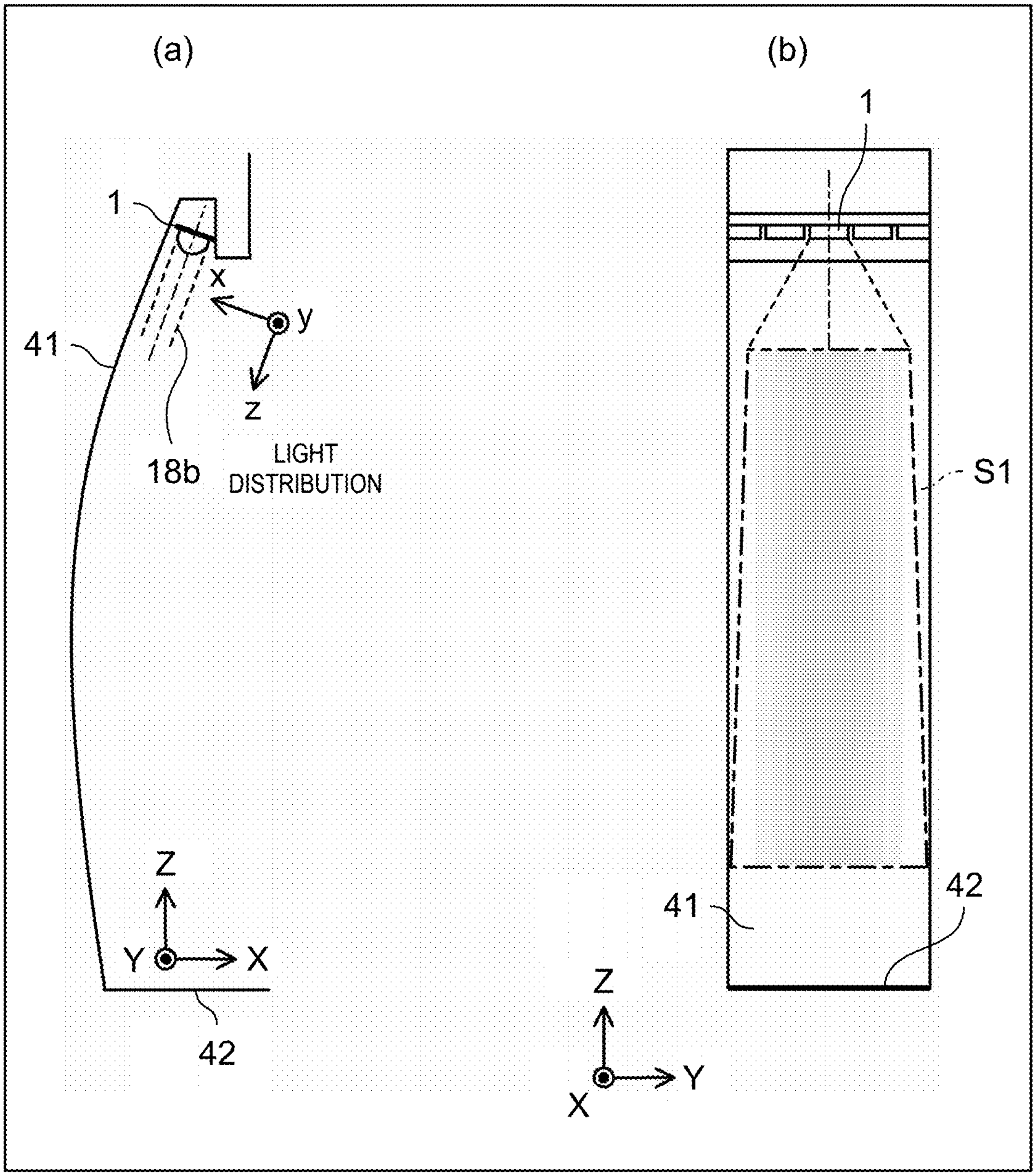
FIG. 3 is a view illustrating an arrangement example of the lighting device according to the first exemplary embodiment.

FIG. 3 is a view illustrating an arrangement example of the lighting device according to the first exemplary embodiment. Specifically, part (a) of FIG. 3 is a side view illustrating the light distribution of the lighting device, and part (b) of FIG. 3 is a front view illustrating the light distribution of lighting device 1. In the following description, XYZ coordinates different from the xyz coordinates in FIGS. 1 and 2 may be used. Specifically, Y direction is the same as the y direction, Z direction is the same as the up-down direction, and Y direction is a direction perpendicular to the X direction and the Z direction.

As illustrated in parts (a) and (b) of FIG. 3, lighting device 1 is disposed above floor surface 42 and emits light to lighting target surface 41 (wall surface). Specifically, lighting device 1 is disposed such that the light emission direction is inclined with respect to the up-down direction.

As described above, emission surface 112 of lens 11 is a curved surface having a prominent convex shape along the x direction and a gentle convex shape along the y direction. That is, lighting device 1 emits a light not diffusing in the X direction and diffusing in the Y direction. Therefore, lighting device 1 can create a light distribution wide in the X direction and the Y direction on lighting target surface 41. Therefore, by using lens 11 having emission surface 112 according to the present exemplary embodiment, lighting device 1 can be downsized, and lighting quality can be ensured even when lighting device 1 is disposed close to lighting target surface 41.

In addition, incident surface 111 of lens 11 is a concave curved surface having convex portion 111*a* at the central portion in an xy plane. That is, light distribution S1 of lighting device 1 has illuminance reduced in the central portion and smoothly changing toward the outer rim (see part (b) of FIG. 3). Therefore, lighting device 1 creates light distribution S1 that gradually changes darker from the central portion to the outer edge. A sharp decrease in illuminance to become darker at the outer edge in the light distribution of lighting device 1 is suppressed.

In a conventional lighting device, light distribution control is performed by a mirror or the like. Thus, there is a sharp decrease in illuminance to become darker at an end portion in the illuminance distribution, which makes it difficult to ensure lighting quality when the lighting device is disposed in a narrow space. Even when a lens (for example, a cylindrical lens) is used instead of a mirror, the outer edge sharply becoming darker in the light distribution cannot be avoided, and thus the lighting quality cannot be ensured. In contrast, by using lens 11 having emission surface 112 according to the present exemplary embodiment, lighting device 1 creates light distribution S1 in which the illuminance gradually becomes darker from the central portion to the outer edge, and this suppresses a sharp decrease in illuminance to become darker at the outer edge in the light distribution of lighting device 1. Accordingly, the lighting device can be downsized, and lighting quality can be ensured even when the lighting device is disposed near a lighting target surface.

Second Exemplary Embodiment

Figure 4A:
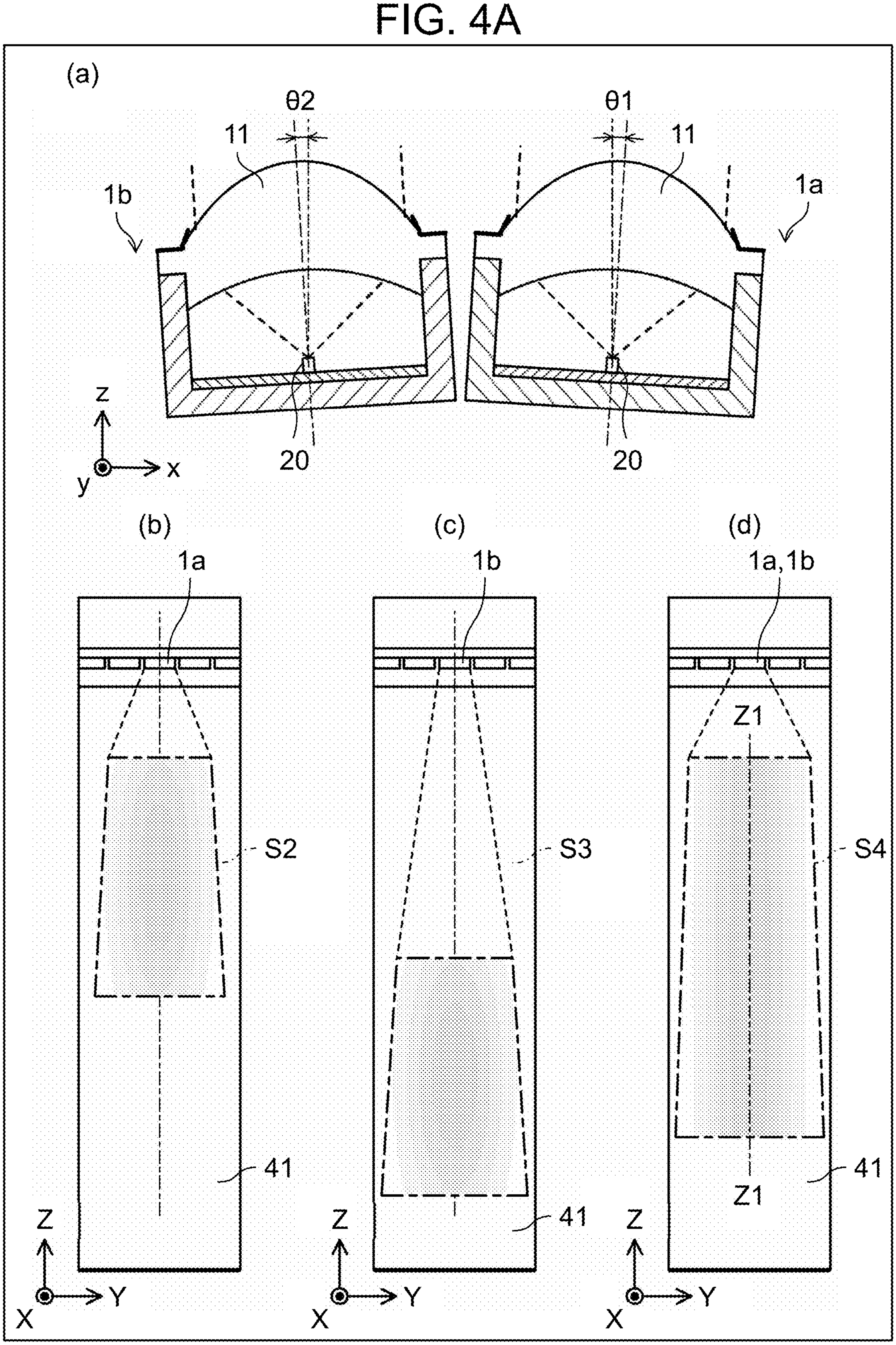
FIG. 4A is a view for explaining a lighting device according to a second exemplary embodiment.
Figure 4B:
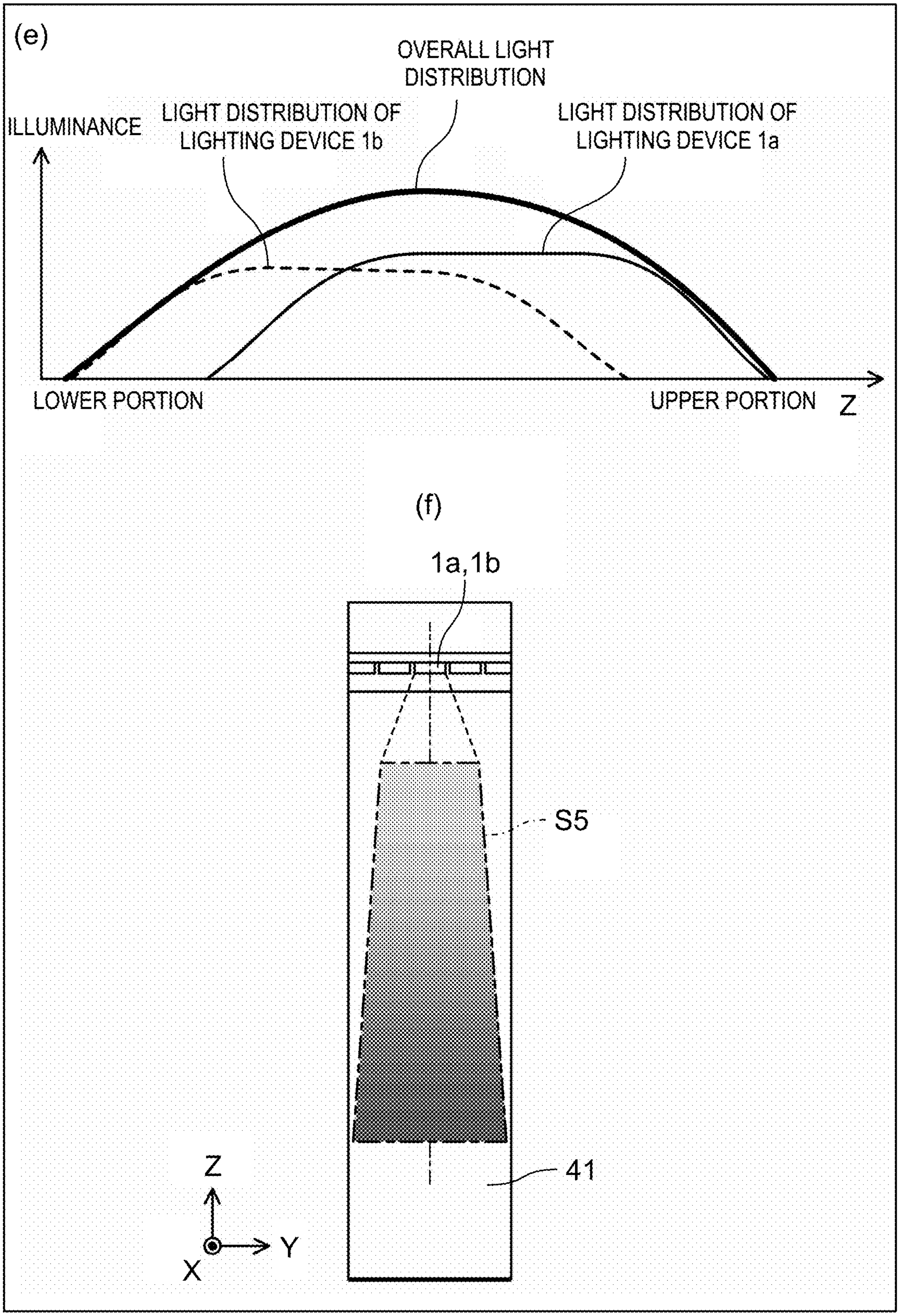
FIG. 4B is a view for explaining the lighting device according to the second exemplary embodiment.

FIG. 4 is a view for explaining a lighting device according to a second exemplary embodiment. Specifically, part (a) of FIG. 4A is a side cross-sectional view of lighting devices 1*a* and 1*b*, part (b) of FIG. 4A is a front view illustrating the light distribution of lighting device 1*a*, part (c) of FIG. 4A is a front view illustrating the light distribution of lighting device 1*b*, part (d) of FIG. 4A is a front view illustrating the light distribution of lighting devices 1*a* and 1*b*, and part (e) of FIG. 4B is the illuminance distribution diagram in Z1-Z1 cross section in part (d) in FIG. 4. Note that each of lighting devices 1*a* and 1*b* has the same configuration as lighting device 1 and includes LED light source 20 of the same color.

As illustrated in part (a) of FIG. 4A, in the second exemplary embodiment, two lighting devices 1 (1*a*, 1*b*) are arranged in the x direction. In lighting devices 1*a* and 1*b*, LED light sources 20 that emit light at predetermined angles θ1 and θ2 with respect to the optical axis direction of lenses 11 are disposed. With the arrangement of LED light sources 20, lighting devices 1*a* and 1*b* create light distribution S2 for lighting the upper part of lighting target surface 41 and light distribution S3 for lighting the lower part of lighting target surface 41 (see parts (b) and (c) of FIG. 4A). When lighting devices 1*a* and 1*b* are arranged in the x direction as illustrated in part (a) of FIG. 4A, the lower end portion of light distribution S2 of lighting device 1*a* and the upper end portion of light distribution S3 of lighting device 1*b* overlap each other, and lighting devices 1*a* and 1*b* create light distribution S4 as illustrated in part (d) of FIG. 4A. Thus, as illustrated in part (e) of FIG. 4B, light distribution S4 (overall light distribution) of lighting devices 1*a* and 1*b* has no unevenness in illuminance, and uniform lighting can be created.

When LED light sources 20 of different colors are arranged in lighting devices 1*a* and 1*b*, lighting devices 1*a* and 1*b* create light distribution S5 as illustrated in part (f) of FIG. 4B. As described above, since the lower end portion of light distribution S2 of lighting device 1*a* and the upper end portion of light distribution S3 of lighting device 1*b* overlap each other, light distribution S5 of lighting devices 1*a* and 1*b* has a gradation in which the color gradually changes from the upper portion to the lower portion. For example, when lighting device 1*a* has LED light source 20 of red and lighting device 1*b* has LED light source 20 of blue, light distribution S5 of lighting devices 1*a* and 1*b* has a gradation from the top to the bottom in which the color gradually changes from red to magenta and then from magenta to blue. That is, gradational expression can be made by disposing lighting devices 1*a* and 1*b* having LED light sources 20 of different colors.

In the present exemplary embodiment, the case where two lighting devices 1 (1*a*, 1*b*) are arranged has been exemplary described, but three or more lighting devices 1 may be arranged.

In the present exemplary embodiment, a plurality of lighting devices 1 (1*a*, 1*b*) are arranged in the x direction, but the arrangement of lighting devices 1 is not limited thereto. A similar effect can be obtained by at least overlapping the light distributions of a plurality of lighting devices 1 in a range along the up-down direction.

Third Exemplary Embodiment

Figure 5A:
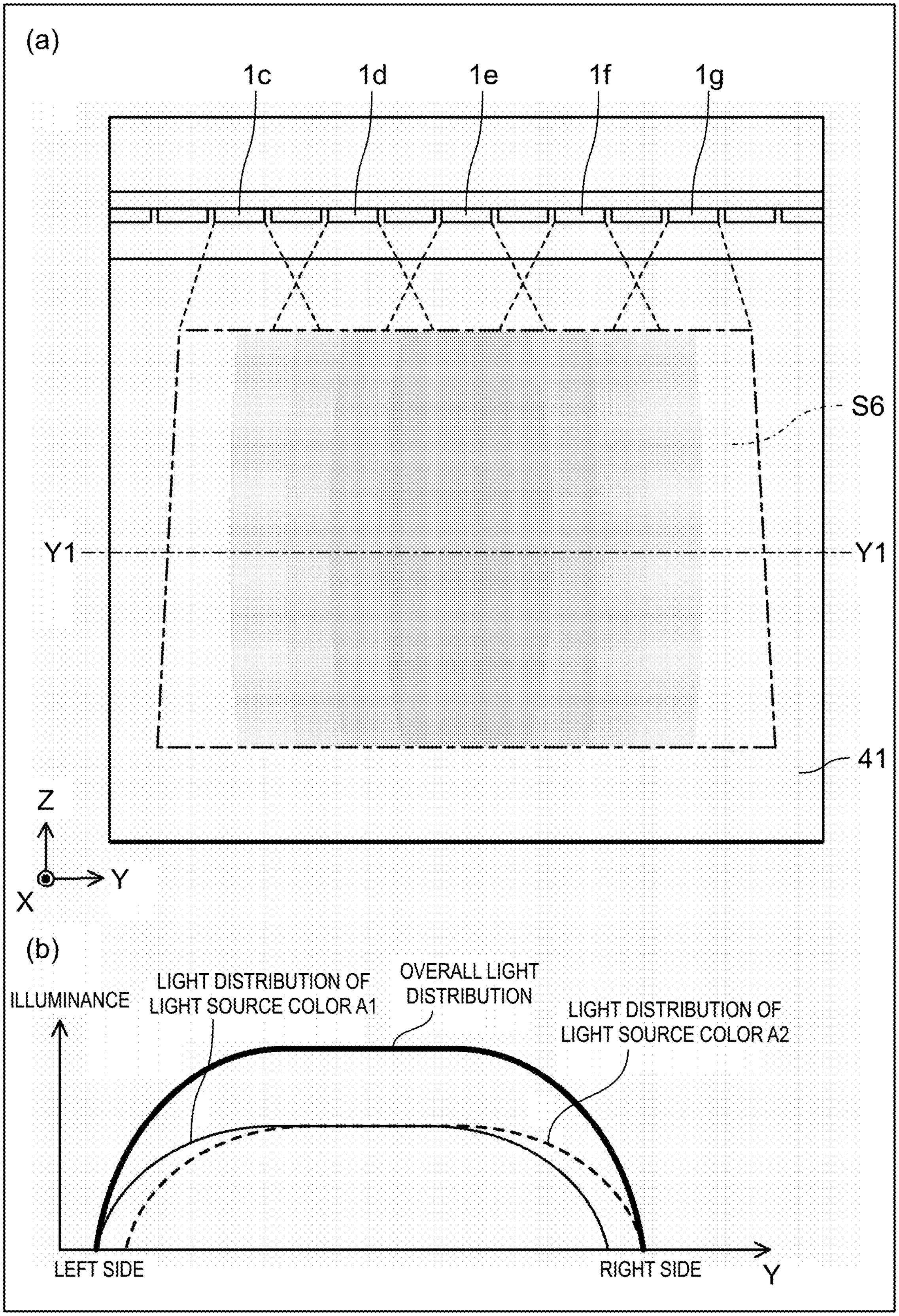
FIG. 5A is a view for explaining a lighting device according to a third exemplary embodiment.
Figure 5B:
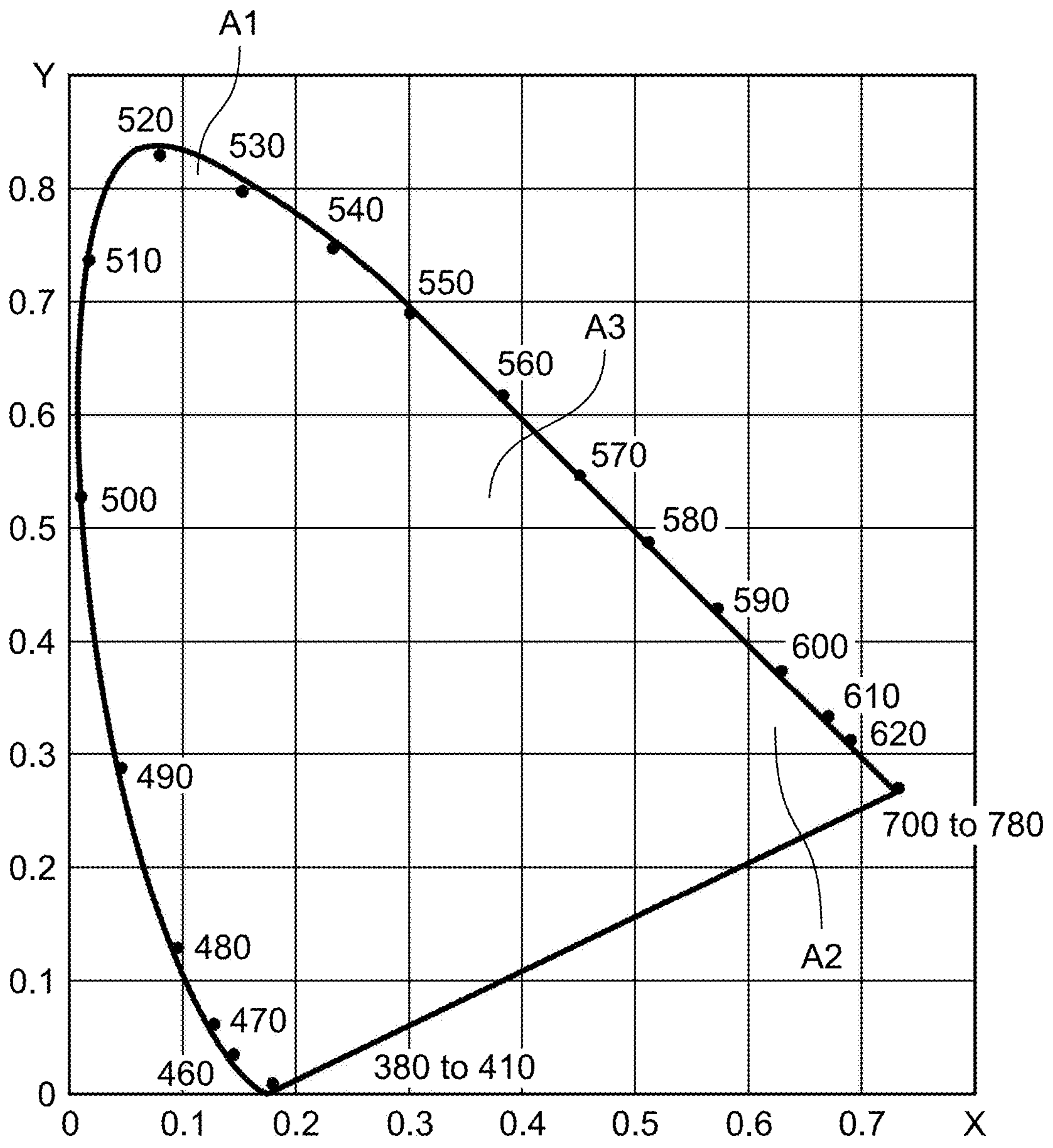
FIG. 5B is a view for explaining the lighting device according to the third exemplary embodiment.

FIG. 5 is a view for explaining a lighting device according to a third exemplary embodiment. Specifically, part (a) of FIG. 5A is a front view illustrating the light distribution of lighting devices 1*c* to 1*g*, part (b) of FIG. 5A is the illuminance distribution diagram in Y1-Y1 cross section in part (a) of FIG. 5A, and FIG. 5B is an XY chromaticity diagram. Note that lighting devices 1*c* to 1*g* have the same configuration as lighting device 1.

As illustrated in part (a) of FIG. 5A, in the third exemplary embodiment, lighting devices 1*c* to 1*g* are arranged in the Y direction at a predetermined interval on the upper portion of lighting target surface 41. In lighting devices 1*c* to 1*g*, LED light sources 20 of different colors are arranged.

As illustrated in part (b) of FIG. 5A, in light distribution S6 (overall light distribution) of lighting devices 1*c* to 1*g*, the illuminance is uniform at the central portion and gradually decreases toward left and right ends. This is because the light distributions of adjacent lighting devices 1 (1*c* to 1*g*) overlap by their ends in the Y direction, and this eliminates unevenness in illuminance in light distribution S6 of lighting devices 1*c* to 1*g*.

Here, a method of setting the color of LED light sources 20 arranged in lighting devices 1*c* to 1*g* will be described with reference to FIG. 5B. The XY chromaticity diagram is a type of color system for expressing color, and a color is expressed as a color mixing ratio by distributions of chromaticity X and chromaticity Y. Therefore, any color can be expressed by appropriately combining the chromaticity X and chromaticity Y. The colors of LED light sources 20 of lighting devices 1*c* to 1*g* are set based on the XY chromaticity diagram.

For example, when light distribution S6 of lighting devices 1*c* to 1*g* has a gradation that gradually changes from green to red, the color of LED light source 20 of lighting device 1*c* is set to green (light source color A1, XY chromaticity coordinates (0.1, 0.8)), and the color of LED light source 20 of lighting device 1*g* is set to red (light source color A2, XY chromaticity coordinates (0.6, 0.3)). The colors of LED light sources 20 of lighting devices 1*d* to 1*f* are determined based on the XY chromaticity diagram in accordance with the intervals in the arrangement of lighting devices 1*c* to 1*g*. For example, in a case where lighting device 1*e* is disposed at an intermediate point between lighting devices 1*c* and 1*g*, the color of LED light source 20 of lighting device 1*e* is set to yellow (light source color A3, XY chromaticity coordinates (0.35, 0.55)) which is the color at the intermediate point between light source colors A1 and A2. As described above, by determining the color of LED light source of each lighting device based on the arrangement of the lighting devices and the XY chromaticity diagram, a vivid gradational expression can made by the lighting devices.

In the present exemplary embodiment, the colors of the LED light sources of lighting devices 1*c* to 1*g* are different, but the LED light sources of lighting devices 1*c* to 1*g* may be of the same color. In this case, light distribution S6 of lighting devices 1*c* to 1*g* has illuminance which is uniform in the central portion and gradually decreasing toward the left and right ends, so that light distribution S6 of lighting devices 1*c* to 1*g* has no unevenness in illuminance and can create uniform lighting.

In the present exemplary embodiment, the case where five lighting devices 1 (1*c* to 1*g*) are arranged has been exemplary described, but two to four or six or more lighting devices 1 may be arranged.

In the present exemplary embodiment, a plurality of lighting devices 1 (1*a*, 1*b*) are arranged in the Y direction, but the arrangement of lighting devices 1 is not limited thereto. A similar effect can be obtained by at least overlapping the light distributions of a plurality of lighting devices 1 in a range along the Y direction.

Fourth Exemplary Embodiment

Figure 6:
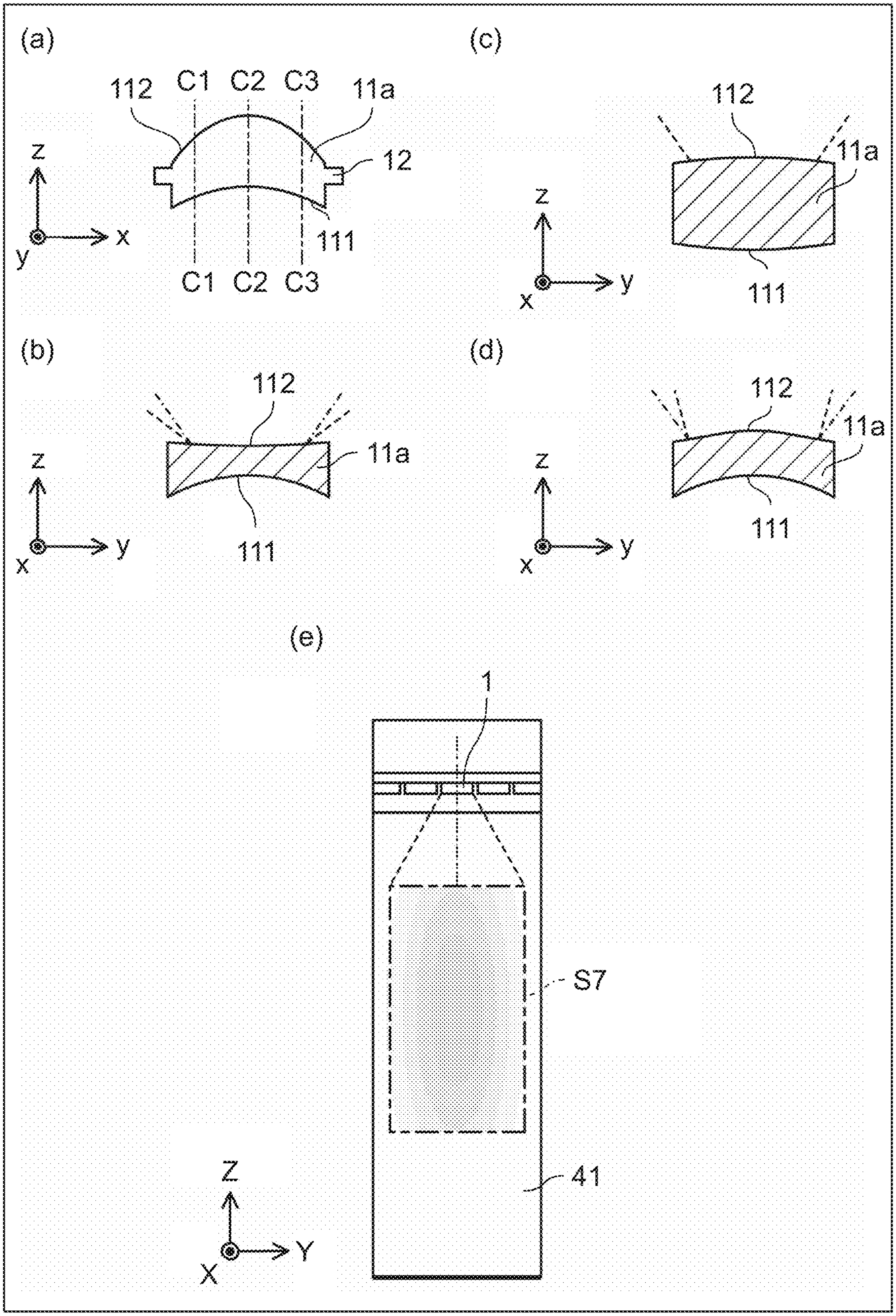
FIG. 6 is a view for explaining a lighting device according to a fourth exemplary embodiment.

FIG. 6 is a view for explaining a lighting device according to a fourth exemplary embodiment. Specifically, part (a) of FIG. 6 is a side view of lens 11*a*. Part (b) of FIG. 6 is C1-C1 cross section in part (a) of FIG. 6, and is a cross section of a lens 11*a* portion to emit light to the upper portion of lighting target surface 41. Emission surface 112 in part (b) of FIG. 6 is an example of a first end, in the x direction, of emission surface 112. Part (c) of FIG. 6 is C2-C2 cross section in part (a) of FIG. 6, and is a cross section of a lens 11*a* portion to emit light to the central portion, in the up-down direction, of lighting target surface 41. Part (d) of FIG. 6 is C3-C3 cross section in part (a) of FIG. 6, and is a cross section of a lens 11*a* portion to emit light to the lower portion of lighting target surface 41. Emission surface 112 in part (d) of FIG. 6 is an example of a second end, in the x direction, of emission surface 112. Part (e) of FIG. 6 is a diagram illustrating the light distribution of lighting device 1 in which lens 11*a* is disposed. In part (e) of FIG. 6, lens 11*a* is disposed instead of lens 11 in lighting device 1. Lens 11*a* is formed of the same member as lens 11. In parts (b) and (d) of FIGS. 6, the light emitted from lens 11*a* in part (c) of FIG. 6 is indicated by one-dot chain lines.

As illustrated in parts (a) to (d) of FIGS. 6, lens 11*a* has emission surface 112 asymmetric in the x direction. Specifically, lens 11*a* has emission surface 112 that has a small curvature at a portion emitting light to the upper portion of lighting target surface 41 (see part (b) of FIG. 6) and a large curvature at a portion emitting light to the lower portion of lighting target surface 41 (see part (d) of FIG. 6). That is, as illustrated in FIG. 6, emission surface 112 in part (b) of FIG. 6 has a negative curvature along the y direction, and emission surface 112 in part (d) of FIG. 6 has a positive curvature along the y direction. Therefore, the light emitted from emission surface 112 corresponding to the upper portion of lighting target surface 41 is diffused more widely in the Y direction (y direction) than the light emitted from emission surface 112 corresponding to the lower portion of lighting target surface 41.

In the above description, the relationship of curvature between the first end and the second end in the x direction has been described. The same curvature relationship may be given between a third end and a fourth end (not illustrated) of emission surface 112 in the y direction. Furthermore, emission surface 112 may have the first end and the second end in the x direction and the third end and the fourth end in the y direction, and the curvatures of the first to fourth ends may satisfy the above relationship. Accordingly, light can be widely diffused as described above.

Note that emission surface 112 in part (b) of FIG. 6 does not necessarily have a negative curvature, and emission surface 112 in part (d) of FIG. 6 does not necessarily have a positive curvature. Required is that emission surface 112 in part (b) of FIG. 6 and emission surface 112 in part (d) of FIG. 6 have different curvatures. That is, emission surface 112 in part (b) of FIG. 6 and emission surface 112 in part (d) of FIG. 6 may both have positive curvatures or negative curvatures. In the present application, that emission surface 112 in part (b) of FIG. 6 and emission surface 112 in part (d) of FIG. 6 have different curvatures includes emission surface 112 in part (b) of FIG. 6 and emission surface 112 in part (d) of FIG. 6 having curvatures of the same absolute value but different polarities. Even with the above configuration, an effect of widely diffusing a light can be obtained. The same applies to the curvatures of the third end and the fourth end.

In each of FIGS. 1 to 5, the light distribution of lighting device 1 has a substantially trapezoidal shape having a narrow upper portion and a wide lower portion. This is because the light emitted from lighting device 1 spreads in the X direction and the Y direction as the light travels far from lighting device 1.

In contrast, lighting device 1 in FIG. 6 has lens 11*a* and thus has substantially rectangular light distribution S7 (see part (e) of FIG. 6) in which light diffusion is wide in the Y direction in the upper portion of lighting target surface 41 and light diffusion is narrow in the Y direction in the lower portion of lighting target surface 41. Since the created light distribution is symmetric in the up-down direction, which is a natural light distribution, a lighting setup with no unpleasant impression can be made. In addition, uniform lighting makes unevenness in illuminance and color less noticeable.

Fifth Exemplary Embodiment

Figure 7:
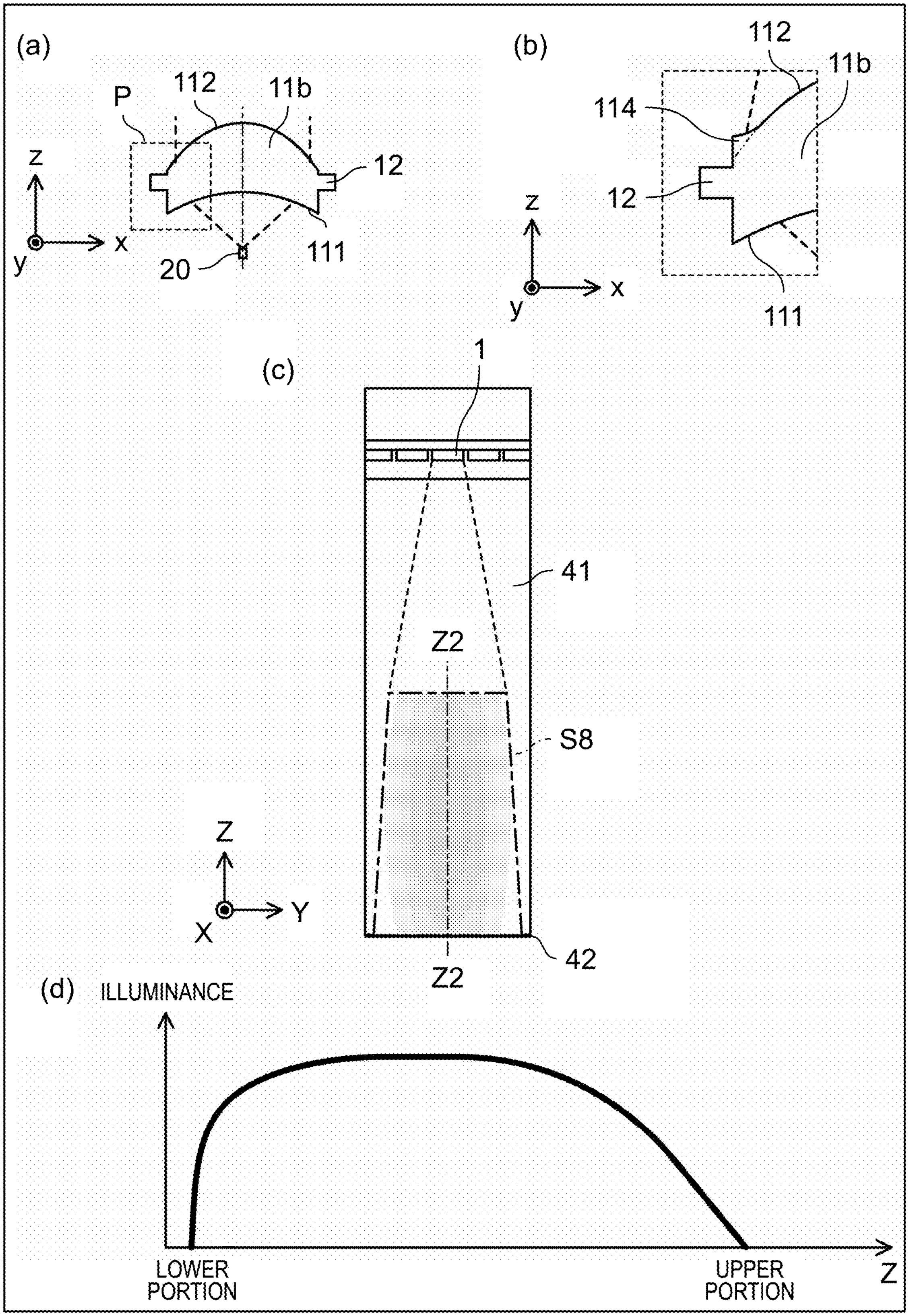
FIG. 7 is a view for explaining a lighting device according to a fifth exemplary embodiment.

FIG. 7 is a view for explaining a lighting device according to a fifth exemplary embodiment. Specifically, part (a) of FIG. 7 is a side cross-sectional view of lighting device 1, part (b) of FIG. 7 is an enlarged view of region P of lens 11*b* in part (a) of FIG. 7, part (c) of FIG. 7 is a view illustrating the light distribution of lighting device 1 in which lens 11*b* is disposed, and part (d) of FIG. 7 illustrates an illuminance distribution diagram in cross section Z2-Z2. In part (c) of FIG. 7, lens 11*b* is disposed instead of lens 11 in lighting device 1. Lens 11*b* is formed of the same member as lens 11.

As illustrated in parts (a) and (b) of FIGS. 7, lens 11*b* has a cutline 114 formed in emission surface 112 on the left side in the drawing. Cutline 114 is provided at the left end in the drawing (the region emitting light to the lower portion of lighting target surface 41) of emission surface 112 to reduce curvature. That is, the left end of emission surface 112 in the drawing is substantially flat. Therefore, lighting device 1 has light distribution S8 in which illuminance sharply decreases at the lower end of lighting target surface 41 (see parts (c) and (d) of FIG. 7).

When lighting device 1 is disposed above lighting target surface 41 and has a light distribution wide in the Z direction (z direction), light distribution S8 of lighting device 1 may not fit within lighting target surface 41 and may reach floor-surface 42. In this case, the light emitted from lighting device 1 may be reflected by floor surface 42 to create stray light.

In contrast, the lighting device according to the fifth exemplary embodiment uses lens 11*b* to create a light distribution in which illuminance sharply decreases at the lower end of lighting target surface 41. This prevents floor surface 42 lighted by the light emitted from lighting device 1.

Sixth Exemplary Embodiment

Figure 8:
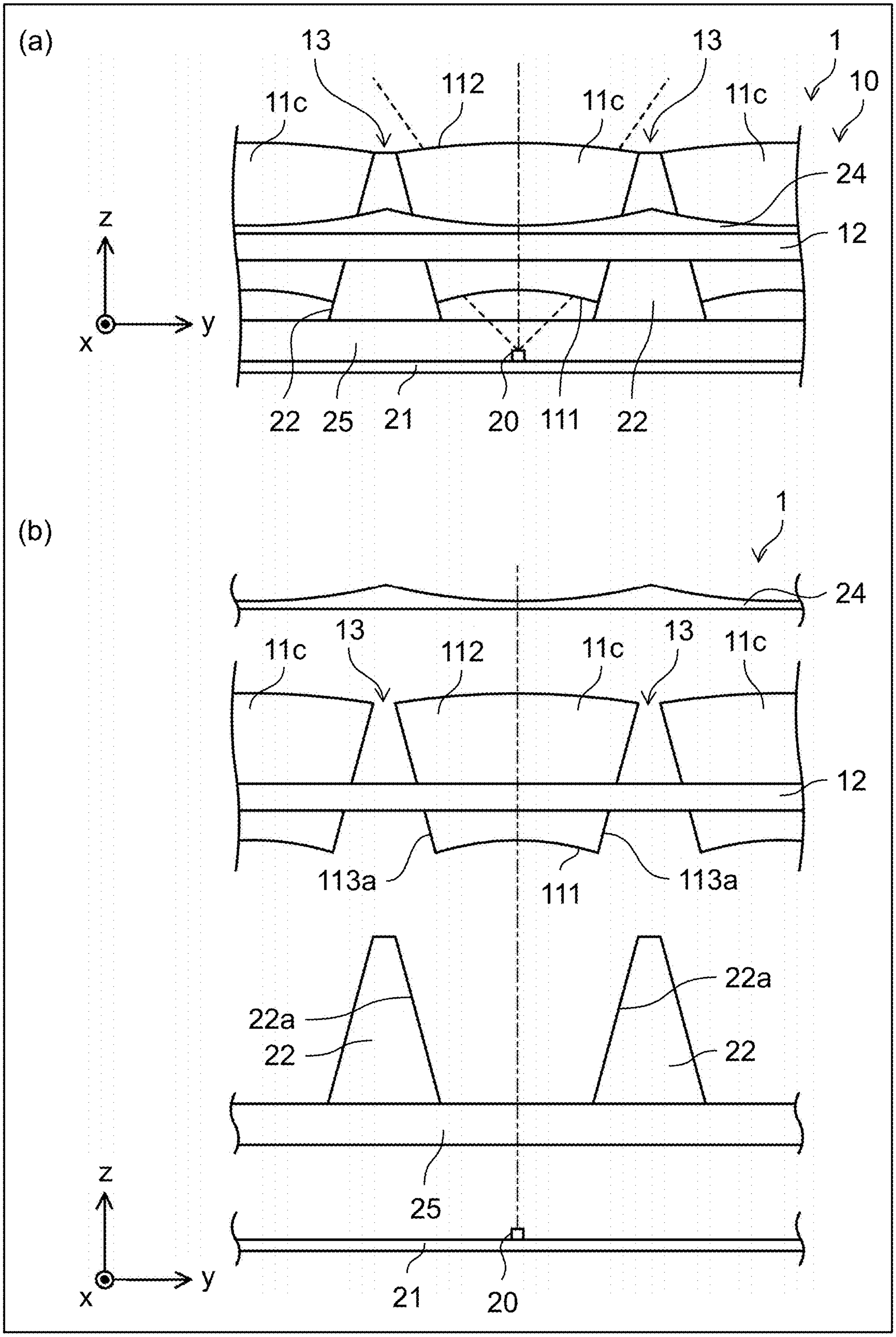
FIG. 8 is a view for explaining a lighting device according to a sixth exemplary embodiment.

FIG. 8 is a view for explaining a lighting device according to a sixth exemplary embodiment. Specifically, part (a) of FIG. 8 is a front view of lighting device 1, and part (b) of FIG. 8 is an exploded front view of lighting device 1. As compared with FIG. 1, lens 11*c* is disposed instead of lens 11 in lighting device 1 in FIG. 8. Furthermore, in lighting device 1 in FIG. 8, a plurality of light shielding plates 22 are connected by holder 25.

As illustrated in parts (a) and (b) of FIGS. 8, lens 11*c* has tapered surfaces 113*a* inclined with respect to the z direction on two side surfaces in the y direction. On two side surfaces, in the y direction, of light shielding plate 22, tapered surfaces 22*a* inclined with respect to the z direction are formed. Tapered surfaces 113*a* and 22*a* are inclined at the same angle with respect to the z direction. Therefore, when light shielding plate 22 is inserted into the corresponding one of slits 13, light shielding plate 22 makes close contact with no air layer with the help of an adhesive or the like.

As described above, a plurality of light shielding plates 22 are connected to holder 25. That is, a plurality of light shielding plates 22 are integrated by holder 25. Therefore, lens unit 10 and LED light sources 20 can be positioned by assembling light shielding plates 22 and holder 25 in housing 30, so that the accuracy of positioning lens unit 10 and LED light sources 20 can be raised. In addition, since a process of assembling each one of light shielding plates 22 in the corresponding one of slits 13 is not necessary, the lighting device is easier to be assembled.

Seventh Exemplary Embodiment

Figure 9:
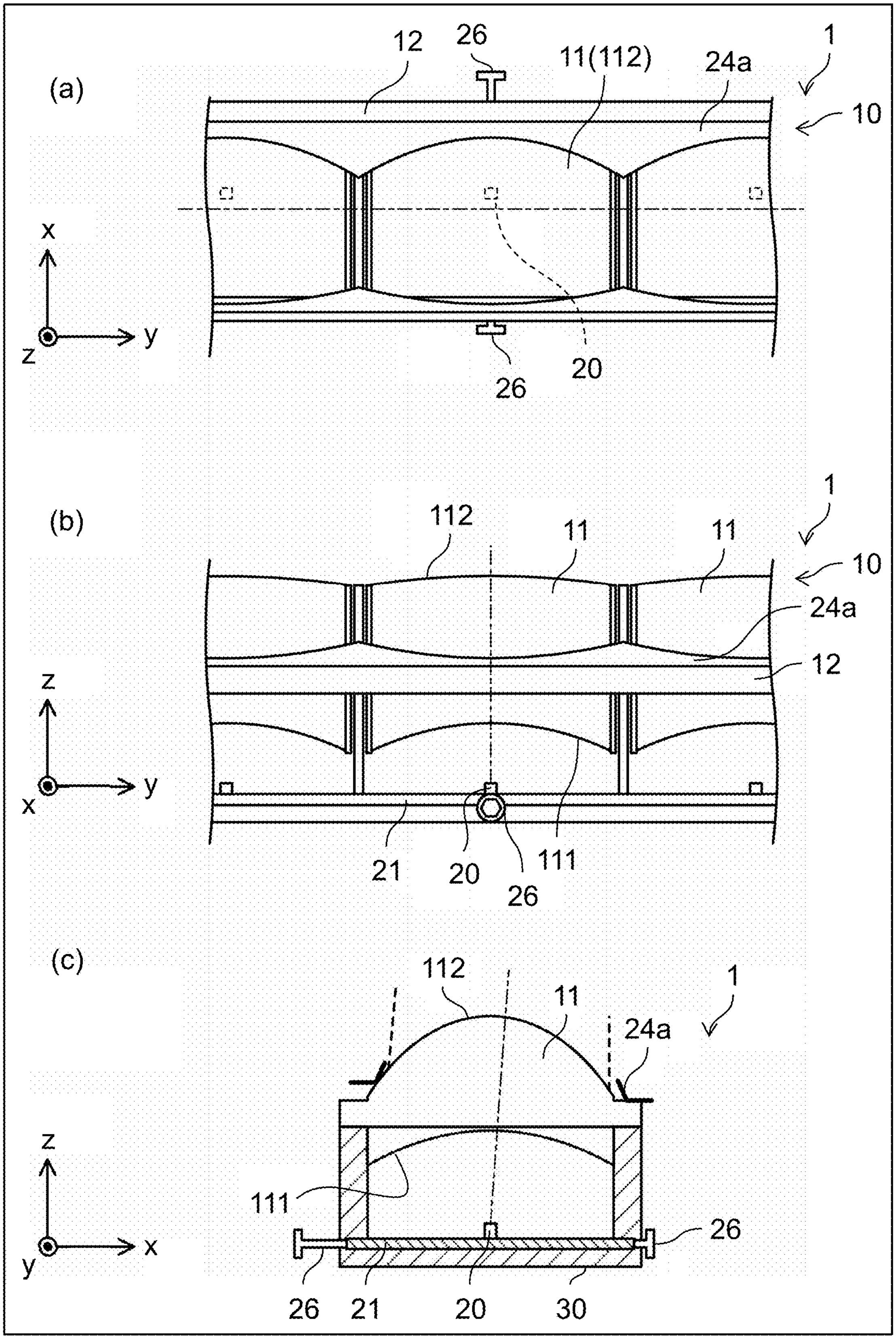
FIG. 9 is a configuration diagram of a lighting device according to a seventh exemplary embodiment.

FIG. 9 is a configuration diagram of a lighting device according to a seventh exemplary embodiment. Specifically, part (a) of FIG. 9 is a top view of lighting device 1, part (b) of FIG. 9 is a front view of lighting device 1, and part (c) of FIG. 9 is a side view of lighting device 1. As illustrated in FIG. 9, lighting device 1 includes a moving mechanism 26 (first moving mechanism).

As illustrated in parts (a) to (c) of FIGS. 9, lighting device 1 includes moving mechanism 26. Moving mechanism 26 includes a screw or the like. The position of LED light source 20 in the x direction can be varied by screwing or unscrewing the screw. That is, since the light emitting direction of LED light source 20 can be shifted by operating moving mechanism 26, the light emission direction of lighting device 1 is variable. For example, in a case where lighting target surface 41 is flat, the light emission direction of lighting device 1 needs not to be varied, but in a case where lighting target surface 41 is curved, the light emission direction of lighting device 1 needs to be varied in accordance with the curvature of lighting target surface 41. When the position of the LED light source is to be adjusted in accordance with the curvature of lighting target surface 41 in the production of lighting device 1, cost will increase and downsizing will be difficult. In contrast, lighting device 1 is free of such problems, since the light emission direction of lighting device 1 can be varied by operating moving mechanism 26.

Furthermore, as illustrated in part (c) of FIG. 9, stray light covers 24*a* that are movable are disposed at left and right ends of emission surface 112 of lens 11. Unnecessary light that is generated by shifting the position of LED light source 20 can be shielded by movable stray light cover 24. There may be provided a mechanism that makes moving mechanism 26 and movable stray light cover 24*a* move in conjunction with each other. In this case, when the moving amount of movable stray light cover 24*a* is determined in advance to correspond to the moving amount of moving mechanism 26 according to the shift amount of the optical axis of LED light source 20, installation of the lighting device can be made easily.

In the present exemplary embodiment, moving mechanism 26 includes a screw (a hexagonal bolt in FIG. 9), but it is not limited thereto. Moving mechanism 26 may be anything that can move the position of LED light source 20. For example, using a hollow set screw (grub screw) or the like for moving mechanism 26 can downsize lighting device 1.

Eighth Exemplary Embodiment

Figure 10:
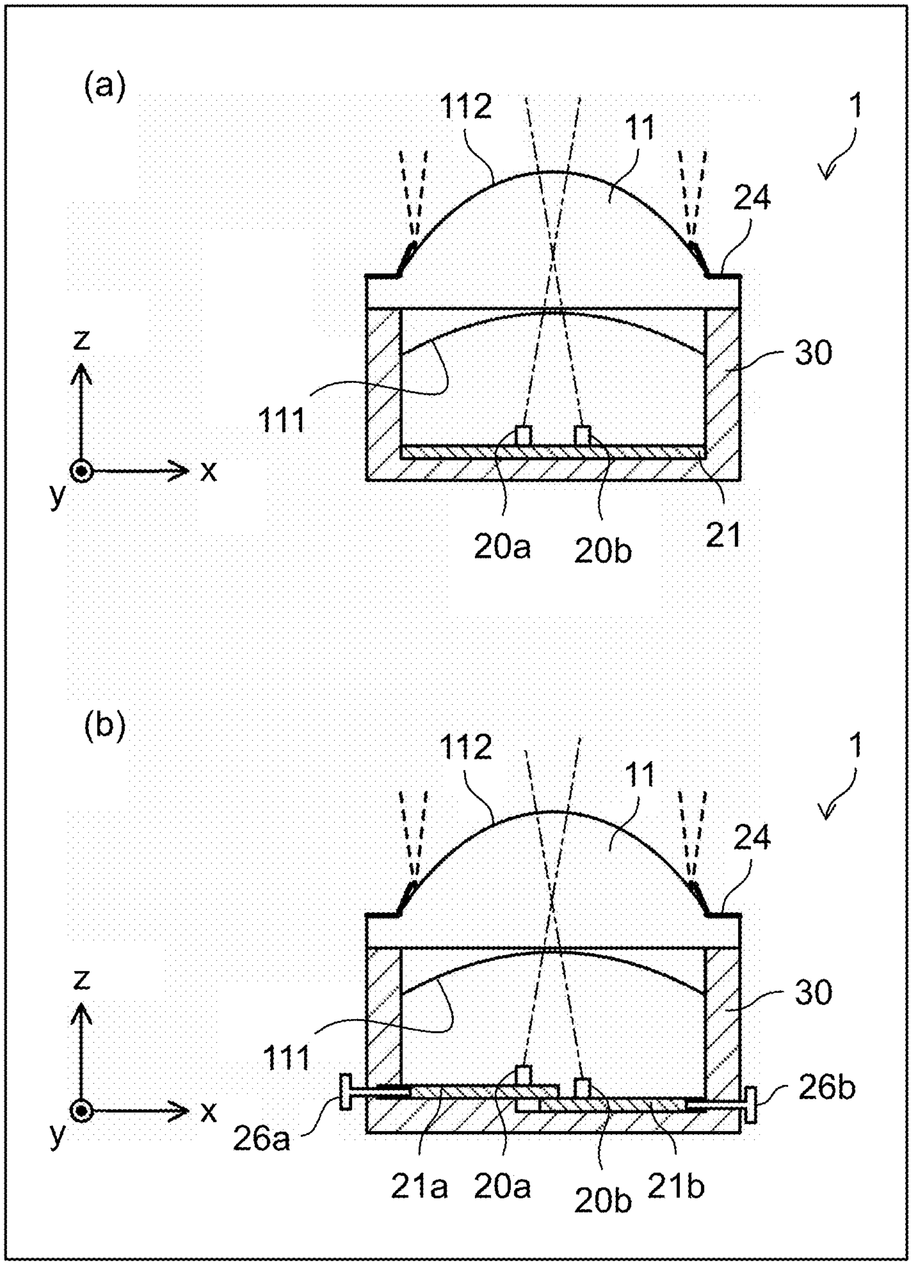
FIG. 10 is a configuration diagram of a lighting device according to an eighth exemplary embodiment.

Part (a) of FIG. 10 is a side view of a lighting device according to an eighth exemplary embodiment.

As illustrated in part (a) of FIG. 10, in lighting device 1, a plurality of (here, two) LED light sources 20*a* and 20*b* are disposed for one lens 11. In part (a) of FIG. 10, LED light sources 20*a* and 20*b* emit light to different regions of lighting target surface 41. In this case, by partially overlapping the light distributions of LED light sources 20*a* and 20*b*, the same effects as that in FIGS. 4, 5, and the like can be obtained. For example, in a case where LED light source 20*a* emits light to the upper portion of lighting target surface 41 and LED light source 20*b* emits light to the upper portion of lighting target surface 41, the lower portion of the light distribution of LED light source 20*a* and the upper portion of the light distribution of LED light source 20*a* overlap, and the same effect as that in FIG. 4 can be obtained. In addition, since a plurality of LED light sources 20 are disposed for one lens 11, the light distribution of the lighting device can be widened and thus the lighting device can be downsized.

Part (b) of FIG. 10 is a side view illustrating another example of the lighting device according to the eighth exemplary embodiment.

As illustrated in part (b) of FIG. 10, LED light sources 20*a* and 20*b* are disposed on LED substrates 21*a* and 21*b*, respectively, in lighting device 1. Lighting device 1 is provided with moving mechanisms 26*a* and 26*b* (second moving mechanism) respectively for moving LED light sources 20*a* and 20*b* in the x direction. This enables varying the positions of LED light sources 20*a* and 20*b*, and an effect similar to that in FIG. 9 can be obtained.

INDUSTRIAL APPLICABILITY

The lighting device of the present disclosure is applicable to a lighting setup in a limited narrow space such as indoors, in a train, in a car, or in an airplane, and can be downsized and disposed close to a lighting target surface.

REFERENCE MARKS IN THE DRAWINGS

1, 1*a* to 1*g*: lighting device
10: lens unit
11, 11*a* to 11*c*: lens
111: incident surface
111*a*: convex portion
112: emission surface
114: cutline

20, 20*a*, 20*b*: LED light source
21, 21*a*, 21*b*: LED substrate
22: light shielding plate
23: absorption layer
24, 24*a*: stray light cover
25: holder
26: moving mechanism (first moving mechanism)
26*a*, 26*b*: moving mechanism (second moving mechanism)
41: lighting target surface
42: floor surface
S1 to S8: light distribution

The invention claimed is:

1. A lighting device that emits light to a lighting target surface, the lighting device comprising:
- a light source; and
- a lens including an incident surface that receives light emitted from the light source and an emission surface that emits the light received by the incident surface, wherein
- the lens is a semi-cylindrical body having one convex top surface including the emission surface, one concave bottom surface including the incident surface, and two semicircular end faces,
- an entirety of the incident surface is a curved surface,
- an entirety of the emission surface is a curved surface, and
- when a longitudinal direction of the semi-cylindrical body is defined as a first direction, and a direction perpendicular to the longitudinal direction and to an optical axis direction is defined as a second direction, a curvature of the emission surface along the first direction is smaller than a curvature of the emission surface along the second direction.

2. The lighting device according to claim 1, wherein the incident surface includes a concave curved surface.

3. The lighting device according to claim 2, wherein the incident surface has a convex portion at a central portion of the incident surface.

4. The lighting device according to claim 1, wherein
- the emission surface has a first end and a second end in the second direction,
- the first end has a first curvature along the first direction, and
- the second end has a second curvature along the first direction and different from the first curvature.

5. The lighting device according to claim 4, wherein
- the first curvature is a negative curvature, and
- the second curvature is a positive curvature.

6. The lighting device according to claim 4, wherein
- the emission surface further includes a third end and a fourth end in the first direction,
- the third end has a third curvature along the second direction, and
- the fourth end has a fourth curvature along the second direction and different from the third curvature.

7. The lighting device according to claim 6, wherein
- the third curvature is a negative curvature, and
- the fourth curvature is a positive curvature.

8. The lighting device according to claim 1, wherein
- the emission surface has a third end and a fourth end in the first direction,
- the third end has a third curvature along the second direction, and
- the fourth end has a fourth curvature along the second direction and different from the third curvature.

9. The lighting device according to claim 8, wherein
- the third curvature is a negative curvature, and
- the fourth curvature is a positive curvature.

10. The lighting device according to claim 1, wherein the emission surface includes a cutline provided at one end of the emission surface in the second direction, a curvature being reduced by the cutline.

11. The lighting device according to claim 1, further comprising:
- a plurality of the lenses arranged in the first direction;
- a light shielding plate disposed in a slit between the plurality of lenses;
- an absorption layer that is disposed on each of surfaces, facing the first direction, of the plurality of lenses and that absorbs light; and
- a stray light cover covering an outer rim of the emission surfaces of the lenses.

12. The lighting device according to claim 11, further comprising
- a plurality of the light shielding plates; and
- a connecting holder that connects the plurality of light shielding plates.

13. The lighting device according to claim 1, further comprising:
- a first moving mechanism that varies a position of the light source; and
- a stray light cover covering an outer rim of the emission surface, wherein
- the stray light cover moves on the emission surface in accordance with a shift of the position of the light source caused by the first moving mechanism.

14. The lighting device according to claim 1, further comprising:
- a plurality of the light sources; and
- a second moving mechanism that varies a position of each of the plurality of light sources.

15. The lighting device according to claim 1, further comprising
- a plurality of the light sources, wherein
- the plurality of light sources are arranged with a light distribution of one light source of the plurality of light sources partially overlapping a light distribution of another light source of the plurality of light sources.

16. The lighting device according to claim 15, wherein the plurality of light sources emit pieces of light of different colors.

17. A lighting device that emits light to a lighting target surface, the lighting device comprising:
- a light source; and
- a lens including an incident surface that receives light emitted from the light source and an emission surface that emits the light received by the incident surface, wherein
- the emission surface is a convex curved surface,
- a curvature of the emission surface along a first direction perpendicular to an optical axis direction of the lens is smaller than a curvature of the emission surface along a second direction perpendicular to the optical axis direction and the first direction,
- the emission surface has a first end and a second end in the second direction,
- the first end has a first curvature along the first direction, and
- the second end has a second curvature along the first direction and different from the first curvature.

* * * * *